United States Patent [19]

McCloskey

[11] 3,788,708

[45] Jan. 29, 1974

[54] BALL BEARING ASSEMBLY

[75] Inventor: Albert R. McCloskey, Fairfield, Conn.

[73] Assignee: Heim Universal Corporation, Fairfield, Conn.

[22] Filed: July 14, 1972

[21] Appl. No.: 271,776

[52] U.S. Cl. .............................................. 308/6 C
[51] Int. Cl. ............................................ F16c 29/06
[58] Field of Search ..................................... 300/6 C

[56] References Cited
UNITED STATES PATENTS

| 3,330,606 | 7/1967 | Suda | 308/6 C |
| 2,945,366 | 7/1960 | Sears | 308/6 C |
| 3,357,754 | 12/1967 | Betrix | 308/6 C |
| 3,563,616 | 2/1971 | Allen | 308/6 C |

Primary Examiner—Charles J. Myhre
Assistant Examiner—Barry Grossman

[57] ABSTRACT

An anti-friction ball bearing assembly adapted for mounting on a shaft comprising an outer sleeve and an inner sleeve concentrically fitting within the outer sleeve, the inner sleeve having a number of tracks defining paths for the circulation of balls between the sleeves and the shaft during movement between the shaft and the bearing assembly, the outer surface of the inner sleeve being polyhedronal in shape, the inner surface of the outer sleeve being substantially polyhedronal in shape and generally conforming to the shape of the outer surface of the inner sleeve, the inner surface of the outer sleeve having a number of axially extending arcuately shaped bearing raceways whose radii generally correspond to the radii of the balls, the balls being in full race curvature contact with the raceways while the balls are in their active load carrying positions between the shaft and the outer sleeve.

5 Claims, 5 Drawing Figures

PATENTED JAN 29 1974 3,788,708

3,788,708

BALL BEARING ASSEMBLY

BACKGROUND OF THE INVENTION

This invention relates to a ball bearing assembly adapted to move longitudinally along the shaft.

This invention represents an improvement in ball bearing assembly disclosed in U.S. Pat. application Ser. No. 189,898 filed in the U.S. Patent Office on Oct. 18, 1971 by Andrew Henn.

In particular the invention relates to an anti-friction ball bearing assembly adapted for mounting on a shaft comprising an outer sleeve and an inner sleeve concentrically fitting within the outer sleeve, the inner sleeve having a number of tracks defining paths for the circulation of balls between the sleeves and the shaft during movement between the shaft and the bearing assembly, the outer surface of the inner sleeve being polyhedronal in shape, the inner surface of the outer sleeve being substantially polyhedronal in shape and generally conforming to the shape of the outer surface of the inner sleeve, the inner surface of the outer sleeve having a number of axially extending arcuately shaped bearing raceways whose radii generally correspond to the radii of the balls, the balls being in full race curvature contact with the raceways while the balls are in their active load carrying positions between the shaft and the outer sleeve.

The prior art is replete with different types of recirculating ball bearing assemblies. Typically, the prior art forms of bearings are subject to high rates of wear between their respective parts. Additionally, they are intricate in design and expensive to manufacture. Premature wear may for example occur when the various bearing assembly components are operationally unstable. This instability will cause the recirculating balls to bind during heavy or sustained load conditions. This binding will cause among other things scoring of the balls and shaft which introduces alignment inaccuracies and ultimate failure of the bearing assembly.

U.S. Pat. No. 3,330,606, issued on July 11, 1967 to M. Suda discloses an anti-friction ball bearing assembly in which the balls are in an unstable condition during their "active" or loaded state. The balls of the Suda bearing assembly ride during their active state on a bearing surface disposed on the crown of a convex portion on the inner surface of the outer sleeve. This configuration renders the Suda bearing assembly mechanically unstable. Other forms of bearing art assemblies are likewise deficient in design.

SUMMARY OF THE INVENTION

Accordingly, it is an object of the present invention to provide an anti-friction ball bearing assembly adapted for mounting on a shaft comprising an outer sleeve and an inner sleeve concentrically fitting within the outer sleeve, the inner sleeve having a number of tracks defining paths for the circulation of balls between the sleeves and the shaft during movement between the shaft and the bearing assembly, the outer surface of the inner sleeve being polyhedronal in shape, the inner surface of the outer sleeve being substantially polyhedronal in shape and generally conforming to the shape of the outer surface of the inner sleeve, the inner surface of the outer sleeve having a number of axially extending arcuately shaped bearing raceways whose radii generally correspond to the radii of the balls, the balls being in full race curvature contact with the raceways while the balls are in their active load carrying positions between the shaft and the outer sleeve.

It is another object of the present invention to provide a highly efficient ball bearing assembly capable of being inexpensively manufactured and being simplistic in design.

Another object of the present invention is to provide an improved anti-friction ball bearing assembly having superior load carrying characteristics.

It is still another object of the present invention to provide an improved anti-friction ball bearing assembly which can be manufactured using automated high volume techniques.

It is yet another object of the present invention to provide a superior anti-friction ball bearing assembly in which the bearing surfaces of the outer sleeve can be broached.

Still another object of the present invention is to provide an anti-friction ball bearing assembly wherein the inner surface of the outer sleeve is provided with a number of arcuate raceways of equal radii aligned with the tracks such that they provide full race curvature contact for the rolling balls while they are in their loaded state.

Other objects and advantages of the invention will become apparent as the present invention is better understood from the following disclosure and as shown in the accompanying drawings.

DESCRIPTION OF THE INVENTION

Figure 2:
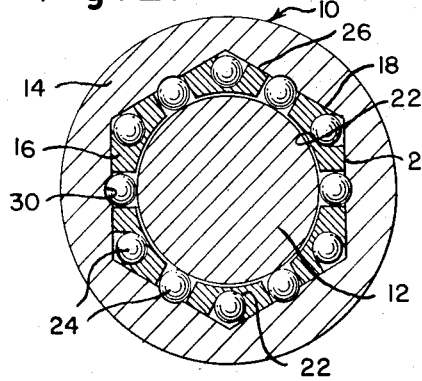
FIG. 2 is a sectional view taken along line 2—2 of FIG. 1.

Referring now to the drawings, there is shown an improved anti-friction ball bearing assembly embodying the concept of the present invention wherein the anti-friction ball bearing assembly is generally designated by the numeral 10.

The anti-friction ball bearing assembly is particularly adapted for being mounted, for linear translation, on a shaft 12. The anti-friction ball bearing assembly 10 is provided with an outer sleeve 14 and an inner sleeve 16. The inner sleeve 16 is concentrically interfitted within the outer sleeve 14. The outer surface 18 of the inner sleeve 16 is essentially polyhedronal in shape having a number of axially extending planar surfaces 20. The inner sleeve 16 if further provided with a number of tracks 22 which define paths for the circulation of the balls 24. The inner surface 26 of the outer sleeve 14 is similarly substantially polyhedronal in shape. The shape of the inner surface 26 of the outer sleeve 14 generally conforms to the shape of the outer surface 18 of the inner sleeve 16. The inner surface 26 of the outer sleeve 14 has a number of axially extending planar surfaces 28. The outer surface 18 of the inner sleeve 16 is in registration with the inner surface 26 of the outer sleeve 14 at their respective axial extending planar surfaces 20 and 28.

Each of the axially extending planar surfaces 28 is provided with axially extending arcuately shaped bearing raceways 30. The axially extending raceways 30 may be located intermediate the lines 31 described by the intersection of the various planar surfaces 28 of the outer sleeve 14. The radii of the axially extending arcuately shaped raceways 30 generally corresponds to the radii of the balls 24.

Retaining means such as snap rings 32 are provided at each end of the anti-friction ball bearing assembly 10 to positionally anchor the inner sleeve 16 into outer sleeve 14 to thereby maintain the operational integrity of the anti-friction ball bearing assembly 10. The snap rings 32 therefore maintain the axial position of the inner sleeve 16 with respect to the outer sleeve 14 while the aforementioned registration of the axial extending planar surfaces 20 and 28 maintain the radial position of the inner sleeve 16 with respect to the outer sleeve 14.

The outer sleeve 14 may be substantially cylindrical in shape and may be provided with annular grooves 34. The grooves 34 may be adapted to receive retaining means such as snap rings (not shown), to positionally anchor or attach the anti-friction ball bearing assembly 10 within or to a bushing or housing member (also not shown).

The planar surfaces 28 may terminate at each end in a concave end surface 36. These concave end surfaces 36 are recessed with respect to the axially extending planar surfaces 26 of the outer sleeve 14 and arcuately shaped raceways 30. A smooth transition is provided between the arcuately shaped raceways 30 and concave end surface 36 by means such as tapered sleeves 38.

Figure 1:
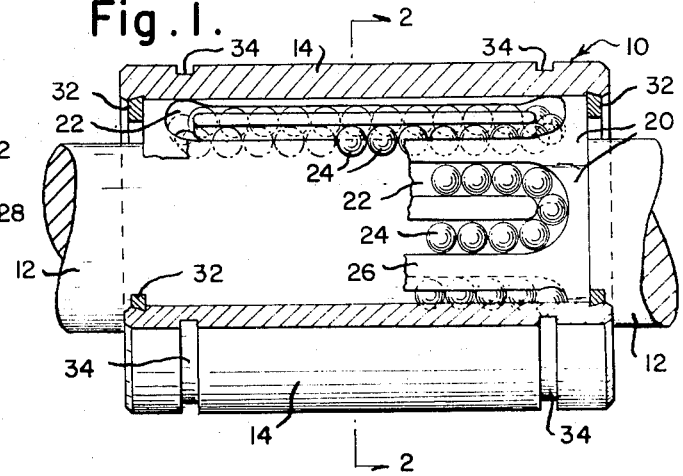
FIG. 1 is a side elevational view, partially cut away, of an anti-friction ball bearing assembly mounted on a shaft embodying the concept of the present invention.
Figure 3:
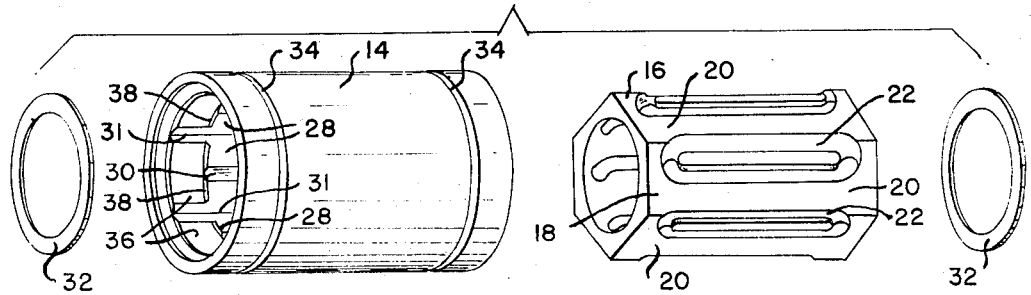
FIG. 3 is an exploded perspective view of the anti-friction ball bearing assembly of FIG. 1.
Figure 4:
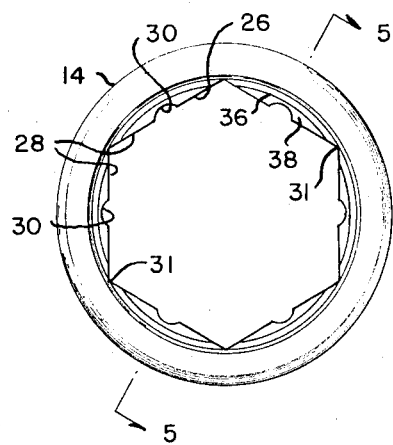
FIG. 4 is a sectional view taken along line 2—2 of FIG. 1 showing only the outer sleeve.
Figure 5:
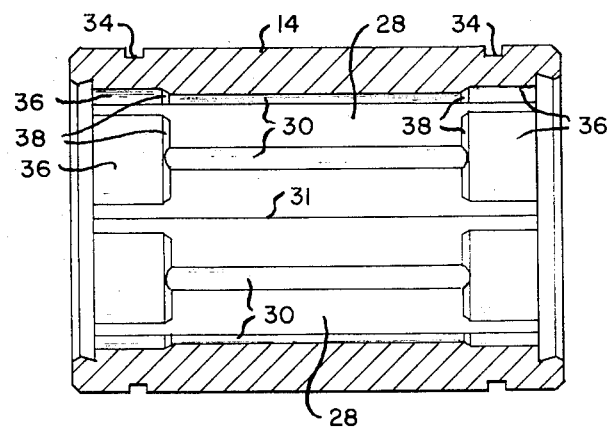
FIG. 5 is a sectional view taken along line 5—5 of FIG. 1 showing only the outer sleeve.

As can be seen from the above, the anti-friction ball bearing assembly 10 can be generally described as a linear (circulating) ball bearing. In particular, the anti-friction ball bearing assembly 10 essentially provides linearly moving bearing support between some member such as the above noted bushing (not shown) and shaft 12. As the anti-friction bearing assembly 10 moves along the shaft 12, the balls 24 will tend to roll and circulate in and through the tracks 22 in the inner sleeve 16. As can best be seen in FIGS. 1 and 2, the balls 24 assume two basic positions, an active or loaded position or an inactive or unloaded position. In the active position, the balls 24 will provide rolling support between the outer sleeve 14 (and in turn the bushing or other member to which it is attached) and the shaft 12, as the shaft 12 and anti-friction ball bearing assembly 10 (and bushing) move with respect to each other. In the inactive position, the balls 24 are in effect doing no useful work but are being recirculated to their active position. The balls 24, when in their inactive position, are not therefore in contact with the shaft 12.

The balls, of course, will circulate in a direction depending upon the relative motion of the anti-friction ball bearing assembly 10 with respect to the shaft 12. Essentially, the balls 24 will circulate or track in the same direction as the movement of the outer sleeve 14. The balls 24 track from their active to inactive position and will be disengaged from the shaft at the time they encounter the tapered sleeves 38. This occurs before the balls 24 reach the curved portion of the tracks 22.

The inner sleeve therefore has no load imparted to it by the action of the balls and it serves simply as a ball cage. The longitudinal axis of the straight portion of the track 22 in which the balls 24 ride during their unloaded state is generally parallel to the lines 31 described by the inter-section of the planar surfaces 28 of the outer sleeve 14.

As before mentioned, the balls 24 while in their active position will be in engagement with the arcuately shaped axially extending bearing raceways 30 and the shaft 12. The radii of the axially extending arcuately shaped bearing raceways 30 generally correspond to the radii of the balls 24. Therefore, the balls 24 will be in full race curvature contact with the bearing raceways 30 while the balls are in their load carrying positions between the shaft 12 and the outer sleeve 14. The so loaded balls are accordingly afforded a high degree of bearing support by the bearing raceways 30 and substantially frictionless movement is achieved by the anti-friction ball bearing assembly 10 or the shaft 12.

The various components of the anti-friction ball bearing assembly 10 could be manufactured from a wide range of materials utilizing a number of fully automated techniques. For example, the outer sleeve 14 could be manufactured from steel such as SAE 5200 steel. Additionally, the sleeve could be suitably coated and/or treated depending upon application and environment.

As mentioned before, the inner sleeves 16 are effectively isolated from all loads. Accordingly, the inner sleeve 16 could be manufactured from an even wider range of materials such as zinc alloys, plastics as well as other moldable materials. Obviously, the balls and/or the various bearing raceways 30 could be coated with a suitable self-lubricating plastic such as polytetrafluoroethylene.

Both the inner sleeve 16 and the outer sleeve 14 could be manufactured using high volume manufacturing techniques. In particular, the design of the outer sleeve 14 renders it particularly adaptable to broaching. The inner surface 26 of the outer sleeve 24 comprising both the axially extending planar surfaces 28 and the arcuately shaped raceways 30 could be broached by utilizing a pull or push broach. Preferably, a pull broach would be utilized for such a broach would be less apt to bind during the cutting operation of the inner surface 28. Other suitable machining and/or molding operations could likewise be utilized to manufacture and fabricate the inner sleeve.

Assembly of the overall anti-friction ball bearing assembly 10 in a like manner could be accomplished by using advance automated techniques.

Obviously, the present invention is not limited to the specific details as herein described, but is capable of other modifications and changes without departing from the spirit and scope of the appended claims.

I claim:

1. An anti-friction ball bearing assembly comprising an outer sleeve and an inner sleeve concentrically fitting within said outer sleeve, said inner sleeve having an opening therethrough to slidably accommodate a shaft, said inner sleeve having a number of tracks defining paths for the circulation of balls between said sleeves and said shaft during movement between said shaft and said bearing assembly, the outer surface of the inner sleeve being polyhedronal in shape, the inner surface of the outer sleeve being substantially polyhedronal in shape and generally conforming to the shape of said outer surface of said inner sleeve, the inner surface of said outer sleeve having a number of axially extending arcuately shaped bearing raceways whose radii generally correspond to the radii of the balls, the balls being in full race curvature contact with said raceways while said balls are in their active load carrying positions between said shaft and said outer sleeve.

2. An anti-friction ball bearing assembly according to claim 1 wherein said outer surface of said inner sleeve comprises a number of continuous axially extending planar surfaces.

3. An anti-friction ball bearing assembly according to claim 1 wherein said inner surface of said outer sleeve comprises a number of continuous axially extended planar surfaces.

4. An anti-friction ball bearing assembly according to claim 3 wherein said axially extended arcuate bearing raceways are positioned on said inner surface of said outer sleeve intermediate the lines described by the inner section of said axially extending planar surfaces.

5. An anti-friction ball bearing assembly according to claim 1 wherein the inner surface of the inner sleeve is substantially cylindrical in form and adapted to register with and be mounted on a substantially circular shaft.

* * * * *